(No Model.)
E. FUCHS.
COMBINED LOCKET AND COIN AND LETTER SCALE.
No. 324,465. Patented Aug. 18, 1885.
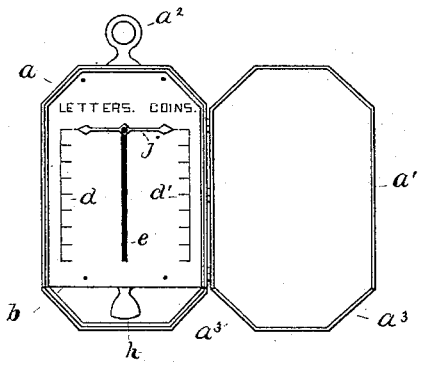
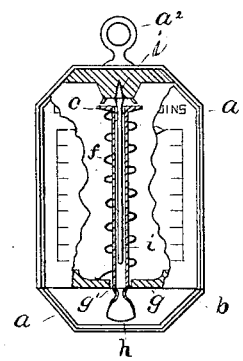
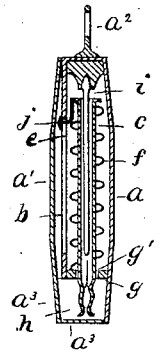
Witnesses:
Wm. Blackburn.
Howe Paige
Inventor:
Ernst Fuchs
By P. H. Gunckel
Attorney

UNITED STATES PATENT OFFICE.

ERNST FUCHS, OF CHICAGO, ILLINOIS, ASSIGNOR OF ONE-HALF TO KARL SCHRIMPF, OF MINNEAPOLIS, MINNESOTA.

COMBINED LOCKET AND COIN AND LETTER SCALE.

SPECIFICATION forming part of Letters Patent No. 324,465, dated August 18, 1885.

Application filed September 27, 1884. (No model.)

*To all whom it may concern:*

Be it known that I, ERNST FUCHS, a citizen of the United States, and a resident of Chicago, county of Cook, and State of Illinois, have invented a certain new and useful Improvement in Locket Letter and Coin Scales, of which the following is a specification.

The object of my invention is to provide a small spring-scale for weighing letters and coins, adapted to be carried on a watch-chain; and the invention consists in providing in a suitable locket a spring-scale and a clasp for holding the letter or coin while it is being weighed.

In the drawings, Figure 1 is a view of the interior of the locket with the cover open; Fig. 2, a view with the cover removed and face broken, showing the scale mechanism in section; and Fig. 3 is a central vertical sectional view of the closed locket.

$a$ is the body of the locket; $a'$, the hinged cover, and $a^2$ a ring for attaching the locket to a watch-chain.

$b$ is a plate secured to the part $a$, leaving sufficient space between the plate and back for the scale-spring. The body $a$ of the locket is open below the plate $b$, and the lower edges, $a^3$, of the cover $a'$ are made to project sufficiently to fit over and close this opening when the cover is close. By this arrangement there is space for the insertion of a coin or the end of a letter when the cover is open, and when the cover is closed the entire weighing apparatus is concealed. On the plate $b$ are scales of weights $d$ and $d'$, for indicating, respectively, the weight of a letter or coin.

$e$ is a slot down the middle of the plate $b$, within which the pointer travels.

$c$ is a small tube bearing a spiral spring, $f$. The spring bears against a shoulder at the top of the tube, and rests upon a base, $g$, at the lower end of the plate $b$. An opening, $g'$, is made in the base $g$, through which the tube $c$ may descend. At the lower end of the tube $c$ are provided clamping-jaws $h$, which project below the bottom $g$, and are arranged to grasp a letter or coin. They may be a prolongation of the tube itself, suitably split to form spring-jaws, or may be separate jaws attached to the end of the tube.

$i$ is a rod fastened longitudinally in the part $a$ at its top, and extending downward within the tube $c$, for the purpose of directing the movement of the tube and preventing friction of the tube or spring against the walls of the locket.

$j$ is a double indicator pointing to the scales $d$ and $d'$, and is connected to the tube $c$ at or near its top.

Having fully described my invention, what I claim, and desire to secure by Letters Patent, is—

1. In a locket, a letter or coin weighing scale comprising a tube bearing a pointer and provided with spring-jaws at its lower end, a guide-rod within said tube, and a plate within the locket provided with scales of weights, substantially as set forth.

2. The combination, with a locket having casing $a$ and cover $a'$, constructed as described, of scale-plate $b$, rod $i$, spring $f$, and tube $c$, provided with spring-jaws $h$ and bearing pointer $j$, substantially as and for the purpose set forth.

ERNST FUCHS.

Witnesses:
GEO. F. NUSSEL,
P. H. GUNCKEL.